(12) United States Patent
Byun

(10) Patent No.: US 11,487,658 B2
(45) Date of Patent: Nov. 1, 2022

(54) MEMORY SYSTEM INCLUDING PLURAL REGIONS STORING DATA AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 428 days.

(21) Appl. No.: 16/688,514

(22) Filed: Nov. 19, 2019

(65) Prior Publication Data

US 2020/0334144 A1    Oct. 22, 2020

(30) Foreign Application Priority Data

Apr. 22, 2019  (KR) .................. 10-2019-0046913

(51) Int. Cl.
*G06F 12/02*   (2006.01)
*G06F 3/06*    (2006.01)

(52) U.S. Cl.
CPC ........ *G06F 12/0253* (2013.01); *G06F 3/0604* (2013.01); *G06F 3/0655* (2013.01); *G06F 3/0673* (2013.01); *G06F 2212/7205* (2013.01)

(58) Field of Classification Search
CPC ............. G06F 12/0253; G06F 12/0246; G06F 3/0608; G06F 3/061; G06F 3/064; G06F 3/0658; G06F 33/0659; G06F 3/0679
See application file for complete search history.

(56) References Cited

U.S. PATENT DOCUMENTS

| | | | |
|---|---|---|---|
| 9,652,415 B2 | 5/2017 | Ellis | |
| 2008/0034174 A1* | 2/2008 | Traister | G06F 12/0246 711/159 |
| 2011/0138100 A1* | 6/2011 | Sinclair | G06F 13/1647 711/E12.082 |
| 2017/0010815 A1 | 1/2017 | Sprouse et al. | |
| 2017/0123972 A1* | 5/2017 | Gopinath | G06F 3/0616 |
| 2017/0132125 A1* | 5/2017 | Cai | G06F 11/1072 |
| 2018/0024921 A1* | 1/2018 | Kanno | G06F 12/0253 711/103 |
| 2019/0042403 A1* | 2/2019 | Du | G06F 12/0246 |
| 2019/0102110 A1* | 4/2019 | Shaharabany | G06F 3/0688 |

FOREIGN PATENT DOCUMENTS

KR   10-2017-0052442    5/2017

* cited by examiner

*Primary Examiner* — Etienne P Leroux
*Assistant Examiner* — Farhad Agharahimi
(74) *Attorney, Agent, or Firm* — IP & T Group LLP

(57) ABSTRACT

A memory system may include a plurality of dies; and a controller coupled to the plurality of dies through a plurality of data paths, the controller being suitable for transmitting first data received from a host and second data obtained through an internal operation in parallel through the plurality of data paths.

19 Claims, 10 Drawing Sheets

FIG. 6

| Index[i] | Destination Block Candidate | Count |
|---|---|---|
| 1 | Die2_BLK2 | 5 |
| 2 | Die2_BLK1 | 10 |
| 3 | Die4_BLK3 | 15 |
| 4 | Die4_BLK1 | 20 |

MEMORY SYSTEM INCLUDING PLURAL REGIONS STORING DATA AND OPERATING METHOD THEREOF

CROSS-REFERENCE TO RELATED APPLICATION

This application claims priority under 35 U.S.C. § 119 to Korean Patent Application No. 10-2019-0046913 filed on Apr. 22, 2019, which is incorporated herein by reference in its entirety.

BACKGROUND

1. Field

Various embodiments relate generally to a memory system including plural regions for storing data, and more particularly, to an apparatus and method for performing garbage collection in a memory system included in a data processing system.

2. Discussion of the Related Art

Recently, the paradigm for the computer environment has shifted to ubiquitous computing, which allows computer systems to be used anytime and anywhere. As a result, the use of portable electronic devices such as mobile phones, digital cameras, and laptop computers has rapidly increased. In general, such portable electronic devices use a memory system including a memory device, that is, a data storage device. A memory system may be used as a main or an auxiliary data storage of a portable electronic devices.

SUMMARY

Various embodiments of the present invention are directed to a data processing system and an operating method thereof capable of reducing degradation in performance of a memory system, increasing the resource utilization efficiency of a memory device, and stably processing data using the memory device.

Also, various embodiments are directed to an operating method of a memory system for performing a garbage collection (GC) operation, a memory system including a controller for performing the operating method and a memory device, and an operating method thereof.

Additionally, various embodiments are directed to a memory system capable of reducing the time required for a garbage collection (GC) operation using a block of another region in which a block included in at least one of a plurality of regions within a memory device divided through data communication lines such as channels or ways, is not positioned, in order to perform the GC operation on the corresponding block, or removing a bottleneck phenomenon in data transfer between the memory device and a controller.

According to an embodiment, a memory system may include a plurality of dies; and a controller coupled to the plurality of dies through a plurality of data paths, the controller being suitable for transmitting first data received from a host and second data obtained through an internal operation in parallel through the plurality of data paths.

According to an embodiment, an operating method of a memory system which includes a plurality of dies and a controller coupled to the plurality of dies through a plurality of data paths, the operating method comprise transmitting first data and second data in parallel through the plurality of data paths, wherein the first data corresponds to a command operation according to a command received from a host, and the second data are obtained through an internal operation.

BRIEF DESCRIPTION OF THE DRAWINGS

FIGS. 4 to 6 are diagrams illustrating data processing operations of a memory system in accordance with an embodiment of the present invention.

DETAILED DESCRIPTION

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

It should be understood that the drawings are simplified schematic illustrations of various embodiments of the described devices and may not include well known details for avoiding obscuring the features of the invention.

It should also be noted that features present in one embodiment may be used with one or more features of another embodiment without departing from the scope of the invention.

Figure 1:
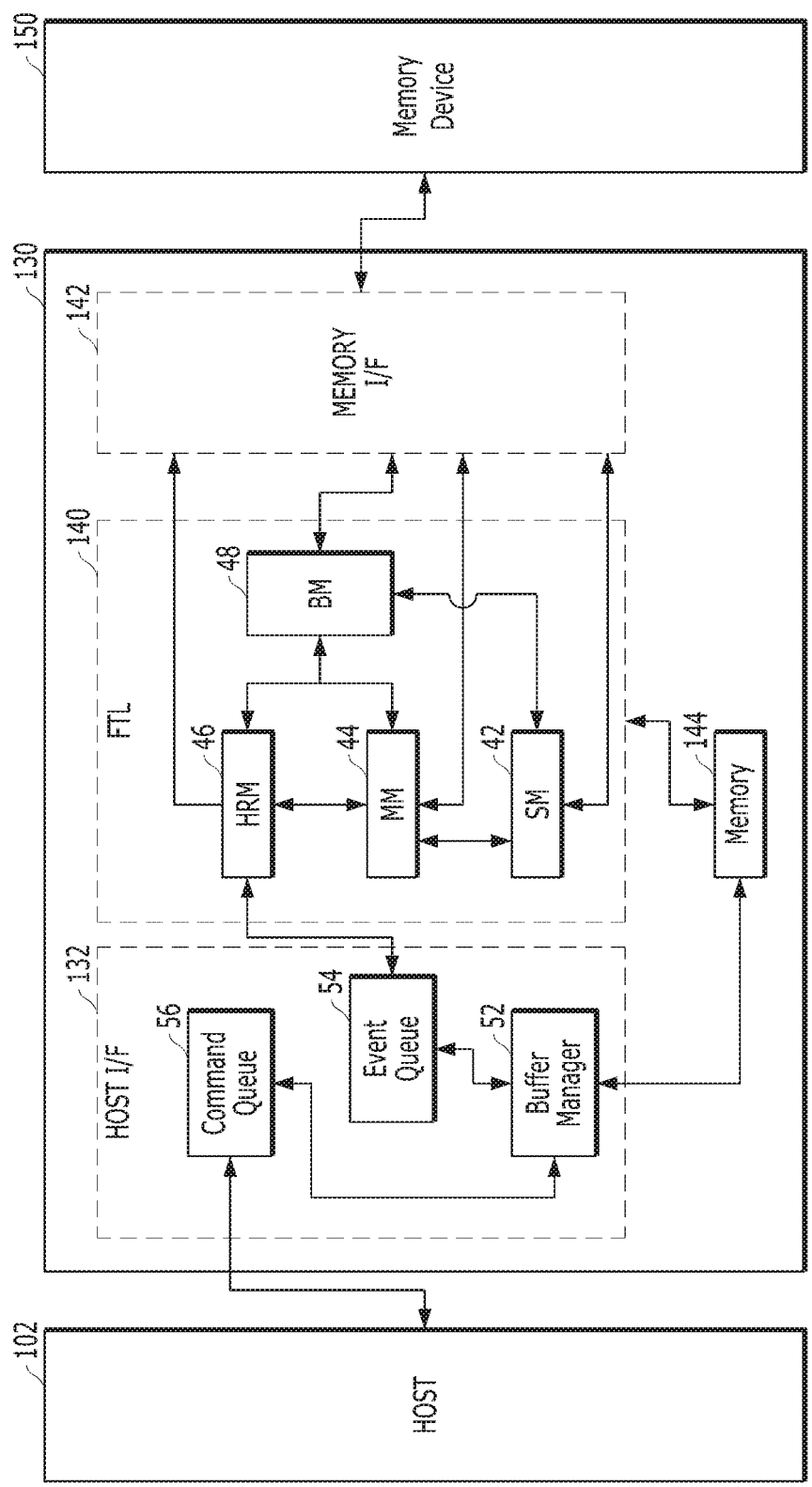
FIG. 1 illustrates a data processing system including a memory system coupled to a host in accordance with an embodiment of the present invention.

FIG. 1 shows a data processing system in accordance with an embodiment of the disclosure.

Referring to FIG. 1, the data processing system includes a memory system which includes a controller 130 and a memory device 150. The memory system is coupled to a host 102. The controller 130 cooperates with the host 102 and the memory device 150. The controller 130 includes a host interface (I/F) 132, a memory interface (I/F) 142, a memory 144 and a flash translation layer (FTL) 140.

The host interface 132 may handle commands and data, which are received from the host 102. By way of example but not limitation, the host interface 132 may include a buffer manager 52, an event queue 54, and a command queue 56. The command queue 56 may sequentially store the commands and the data, and output them to the buffer manager 52 in a stored order. The buffer manager 52 may classify, manage or adjust the commands and the data, which are delivered from the command queue 56. The event queue 54 may sequentially transmit events for processing the commands and the data, which are received from the buffer manager 52.

A plurality of commands and/or data of the same type (e.g., read commands) may be continuously received from the host 102. Alternatively, a plurality of commands and/or data of a different type may be received from the host 102 in a mixed order. For example, the host 102 may transmit a plurality of commands for reading data (i.e, read commands) in a continuous sequence, and then transmit a plurality of write commands (i.e., for programming data, also referred to as programming commands) in a continuous sequence. Or, alternatively, the host 102 may transmit read commands and write commands in a mixed order. The host interface 132 may store the commands and data, which are received from the host 102, to the command queue 56 sequentially in the order received. Thereafter, the host interface 132 may determine the next operation the controller 130 will perform according to the characteristics of the commands, data, and other relevant information received from the host 102. The host interface 132 may determine a processing order according to a priority order of the received commands and data which is based at least in part on their characteristics. According to the characteristics of the received commands and data, the buffer manager 52 is configured to determine whether the buffer manager 52 should store the received commands and data in the memory 144, or whether the buffer manager 52 should deliver the received commands and the data to the FTL 140. The event queue 54 receives events, entered from the buffer manager 52, which are to be internally executed and processed by the memory system 110 or the controller 130 in response to the commands and the data. The event queue 54 delivers the events to the FTL 140 in the order received.

In accordance with an embodiment, the FTL 140 may include a state manager (SM) 42, a map manager (MM) 44, a host request manager (HRM) 46, and a block manager (BM) 48. The host request manager 46 may manage the events entered from the event queue 54. The map manager 44 may handle or control map data. The state manager 42 may perform garbage collection (GC) or wear levelling (WL). The block manager 48 may execute commands or instructions on a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map manager 44, to determine a physical address corresponding to the logical address which is entered with the events. The host request manager 46 may send a read request with the physical address to the memory interface 142, to process the read request (or handle the events). On the other hand, the host request manager 46 may send a program request (or write request) to the block manager 48, to program entered data to a specific page of the unrecorded (no data) in the memory device 150. Then, the host request manager 46 may transmit a map update request corresponding to the program request to the map manager 44, to update an item relevant to the programmed data in mapping information indicating mapping the logical-to-physical addresses to each other.

The block manager 48 may convert a program request delivered from the host request manager 46, the map manager 44, and/or the state manager 42 into a flash program request used for the memory device 150, to manage flash blocks in the memory device 150. In order to maximize or enhance program or write performance of the memory system 110, the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller (i.e., the memory interface 142).

The block manager 48 may be configured to manage blocks in the memory device 150 according to the number of valid pages. Further, the block manager 48 may select and erase blocks having no valid pages when a free block is needed, and select a block including the least number of valid pages when it is determined that garbage collection is necessary. The state manager 42 may perform garbage collection to move the valid data to an empty block and erase the blocks containing the moved valid data so that the block manager 48 may have enough free blocks (i.e., empty blocks with no data). If the block manager 48 provides information regarding a block to be erased to the state manager 42, the state manager 42 checks all flash pages of the block to be erased to determine whether each page is valid. For example, to determine validity of each page, the state manager 42 may identify a logical address stored in an area (e.g., an out-of-band (OOB) area) of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries, and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made, and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) is not completed normally, the map manager 44 may not perform the mapping table update. This is because the map request is issued with old physical information if the state manger 42 requests a map update and a valid page copy is completed later. The map manager 44 may perform a map update operation to ensure accuracy only if the latest map table still points to the old physical address.

The memory device 150 may include a plurality of memory blocks. The plurality of memory blocks may be classified into different types of memory blocks such as a single level cell (SLC) memory block, or a multi-level cell (MLC) memory block, according to the number of bits that can be stored or represented in one memory cell of the block. The SLC memory block includes a plurality of pages implemented by memory cells, each storing one bit of data. The SLC memory block may have high data input and output (I/O) operation performance and high durability. The MLC memory block includes a plurality of pages implemented by memory cells, each storing multi-bit data (e.g., two bits or more). The MLC memory block may have larger storage capacity in the same space than the SLC memory block. The MLC memory block may be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment, the memory device 150 is embodied as a nonvolatile memory such as a flash memory such as a NAND flash memory or a NOR flash memory. In another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM).

Figure 2:
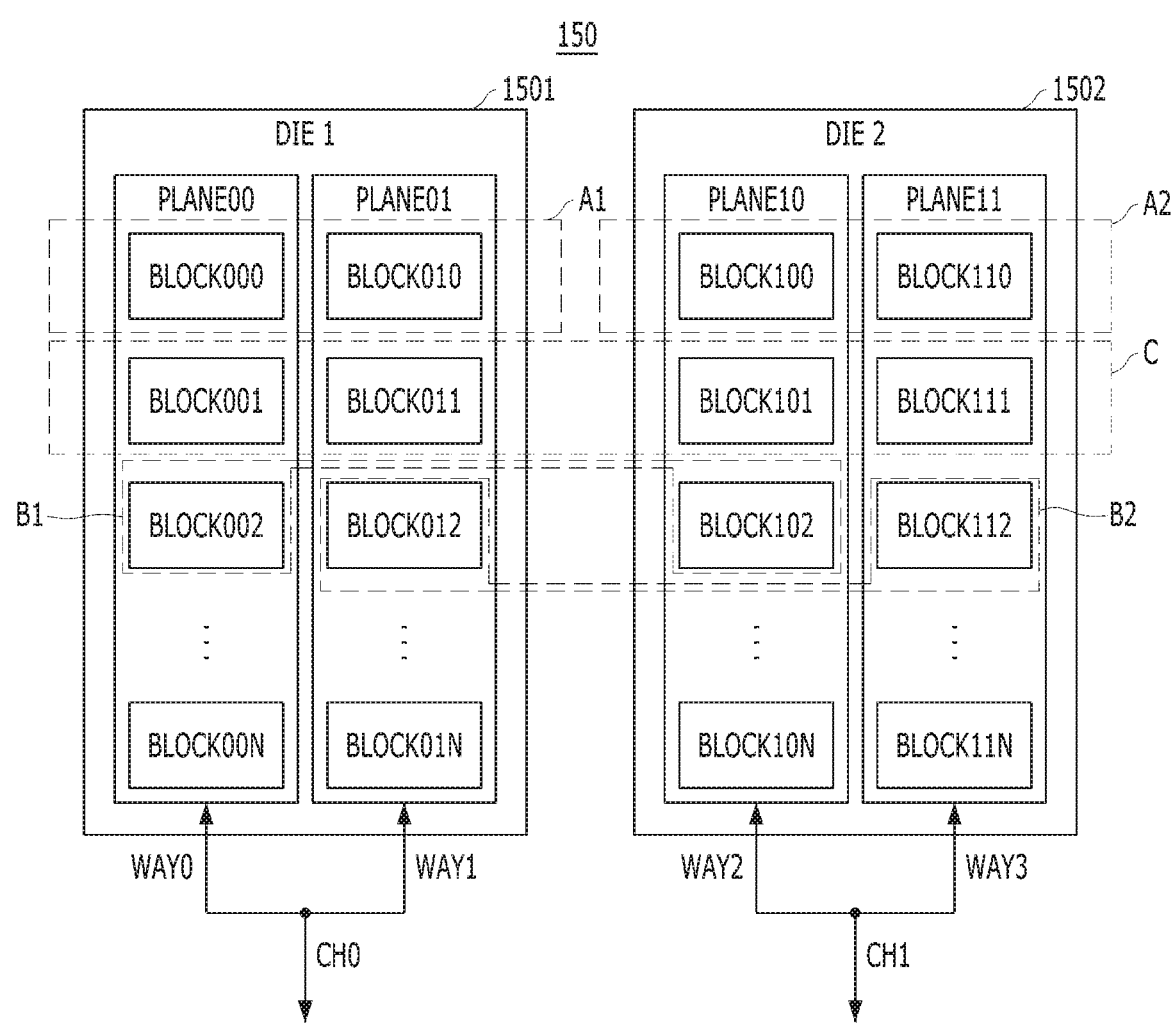
FIG. 2 is a diagram illustrating a super memory block used in a memory system in accordance with an embodiment of the present invention.

FIG. 2 is a diagram illustrating the concept of a super memory block used in a memory system in accordance with an embodiment of the present invention.

FIG. 2 illustrates memory dies 1501 to 150n included in the memory device, such as the memory device 150 of FIG. 1, among the components of the memory system 110 according to an embodiment of the present invention. For example, the memory device 150 may include a first memory die (DIE1) 1501 and a second memory die (DIE2) 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the planes may include a plurality of blocks. For example, the first plane PLANE00 may include first to $N^{th}$ memory blocks BLOCK000 to BLCOK00N, and the second plane PLANE01 may include first to $N^{th}$ memory blocks BLOCK010 to BLCOK01N. The third plane PLANE10 may include first to $N^{th}$ memory blocks BLOCK100 to BLCOK10N, and the fourth plane PLANE11 may include first to $N^{th}$ memory blocks BLOCK110 to BLCOK11N.

The first memory die 1501 is capable of inputting and outputting (inputting/outputting) data through a zeroth channel CH0, and the second memory die 1502 is capable of inputting/outputting data through a first channel CH1. The zeroth channel CH0 and the first channel CH1 may input/output data in an interleaving scheme.

The first memory die 1501 includes the plurality of planes PLANE00 and PLANE01 corresponding to a plurality of ways WAY0 and WAY1, respectively, which is capable of inputting/outputting data in the interleaving scheme by sharing the zeroth channel CH0.

The second memory die 1502 includes the plurality of planes PLANE10 and PLANE11 corresponding to a plurality of ways WAY2 and WAY3, respectively, which are capable of inputting/outputting data in the interleaving scheme by sharing the first channel CH1.

The plurality of memory blocks in the memory device 150 may be divided into groups based on physical locations where the same way or channel is used.

While the embodiment of FIG. 2 shows, as an example, a configuration of the memory device 150 in which there are two dies, each having two planes, the present invention is not limited to this configuration. Any suitable die and plane configuration may be used based on system design considerations. The number of memory blocks in each plane may vary as well.

The controller 130 of FIG. 1 may group memory blocks which can be selected simultaneously, among the plurality of memory blocks in different dies or different planes, based on their physical locations, and manage the memory block groups as super memory blocks.

The scheme in which the controller 130 groups the memory blocks into super memory blocks and manages the super memory blocks may be performed in various ways. Three schemes are described below as examples.

For example, a first scheme is that the controller 130 groups an arbitrary memory block BLOCK000 of the first plane PLANE00 and an arbitrary memory block BLOCK010 of the second plane PLANE01 in the first memory die 1501 of the plurality of memory dies in the memory device 150, and manages the grouped memory blocks BLOCK000 and BLOCK010 as a single super memory block A1. When the first scheme is applied to the second memory die 1502 in the memory device 150, the controller 130 may group an arbitrary memory block BLOCK100 of the first plane PLANE10 and an arbitrary memory block BLOCK110 of the second plane PLANE11 in the second memory die 1502, and manage the grouped memory blocks BLOCK100 and BLOCK110 as a single super memory block A2.

For example, a second scheme is that the controller 130 groups an arbitrary memory block BLOCK002 in the first plane PLANE00 of the first memory die 1501 and an arbitrary memory block BLOCK102 in the first plane PLANE10 of the second memory die 1502, and manages the grouped memory blocks BLOCK002 and BLOCK102 as a single super memory block B1. In addition, according to the second scheme, the controller 130 may group an arbitrary memory block BLOCK012 in the second plane PLANE01 of the first memory die 1501 and an arbitrary memory block BLOCK112 in the second plane PLANE11 of the second memory die 1502, and manage the grouped memory blocks BLOCK012 and BLOCK112 as a single super memory block B2.

For example, a third scheme is that the controller 130 groups an arbitrary memory block BLOCK001 in the first plane PLANE00 of the first memory die 1501, an arbitrary memory block BLOCK011 included in the second plane PLANE01 of the first memory die 1501, an arbitrary memory block BLOCK101 in the first plane PLANE10 of the second memory die 1502, and an arbitrary memory block BLOCK111 in the second plane PLANE11 of the second memory die 1502, and manages the grouped memory blocks BLOCK001, BLOCK011, BLOCK101 and BLOCK111 as a single super memory block C.

Accordingly, simultaneously-selectable memory blocks in each of the super memory blocks may be simultaneously selected through the interleaving scheme. For example, the interleaving scheme may include a channel interleaving scheme, a memory die interleaving scheme, a memory chip interleaving scheme, or a way interleaving scheme.

Figure 3:
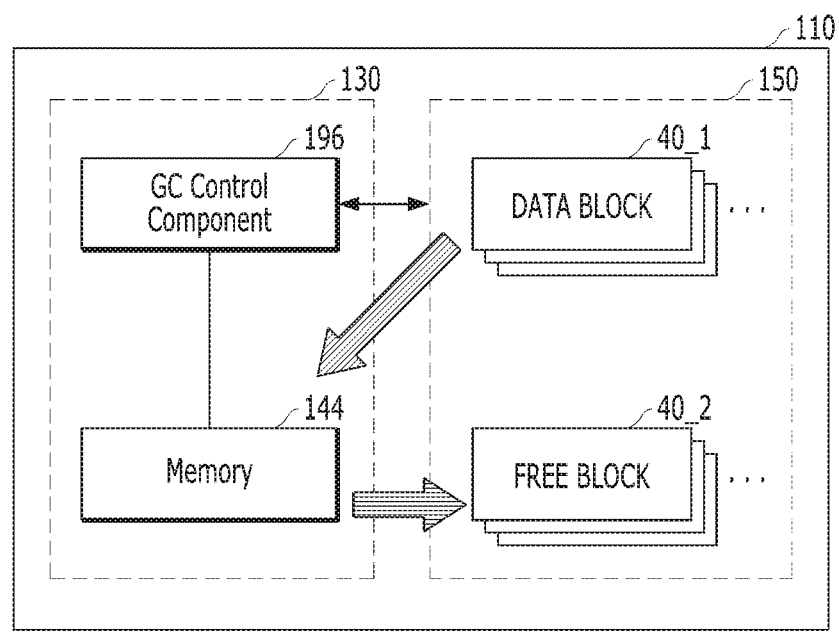
FIG. 3 illustrates an example of a garbage collection (GC) operation in a memory system.

FIG. 3 illustrates an example of a garbage collection (GC) operation in the memory system 110.

Referring to FIG. 3, the memory device 150 may include a plurality of data blocks 40_1 and a plurality of free blocks 40_2. The amount of invalid data stored in the plurality of data blocks 40_1 may be increased by repeated program commands from the controller 130. The controller 130 may include a memory 144 and a GC control component 196. In order to reuse a data block 40_1 in which invalid data is stored, an internal operation (e.g. GC or wear levelling) may be performed. For example, the GC control component 196 may perform GC to change the data block 40_1 having the valid data stored therein into a free block. That is, when GC timing arrives or the number of remaining free blocks is less than or equal to a threshold value, the GC control component 196 may check closed data blocks (hereafter, referred to as source blocks) among the plurality of data blocks 40_1. The GC control component 196 may select, as a victim block, a source block having a smaller number of valid pages than a randomly set threshold value, among the checked source blocks. The reason to select a source block having a small number of valid pages is that, when a GC operation is performed on a source block having a large number of valid pages, the time and cost required for performing the GC operation may be increased, and the lifetime of the memory device 150 may be shortened. Then, the GC control component 196 may copy valid data included in the victim block into a destination block as a free block on which a program operation is not performed. The GC control component 196 may erase the victim block when the valid data are copied and stored in the destination block.

In order to move data from the source block of the memory device 150 to the free block during the above-described GC operation, the controller 130 may read the data from the source block of the memory device 150, load the read data to the memory 144, and then program the data stored in the memory 144 to the free block. Since the controller 130 performs an operation (e.g., read or program operation) on the memory device 150, the controller 130 may stop the GC operation to perform an operation corresponding to a read command or program command, when the command is received from the outside (e.g. the host 102 in FIG. 1) while the GC operation is performed.

When a program operation and a GC operation are performed in parallel to each other, in order to reduce the time and cost required for performing the GC operation, the controller 130 may not stop the GC operation. In other words, the controller 130 may select a destination block from a die different from a die including an open block on which the program operation can be performed, and move the valid data of the victim block to the destination block, in order to perform the program operation and the GC operation in parallel. This process will be described in detail with reference to FIGS. 4 to 10. In the present embodiment, the plurality of dies included in the memory device 150 may be individually managed by one or more channels CHANNEL and ways WAY. Furthermore, it is noted that the invention can be applied to both the memory device 150 composed of super blocks and the memory device 150 which is not composed of super blocks.

Figure 4:
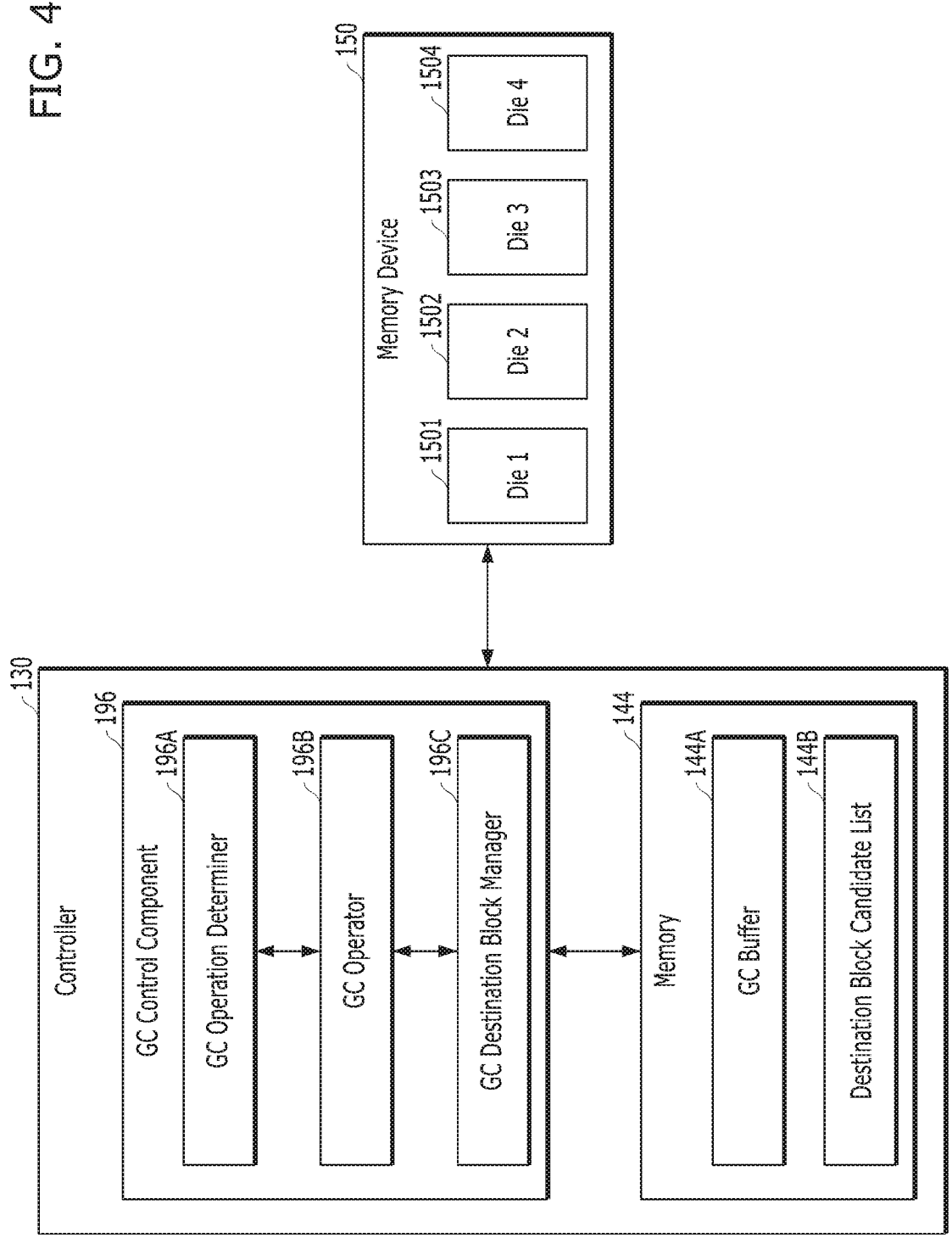

FIGS. 4 and 6 are diagrams illustrating data processing operations of a memory system in accordance with an embodiment of the present invention.

Referring to FIG. 4, the memory system 110 may include a controller 130 and a memory device 150.

Figure 5:
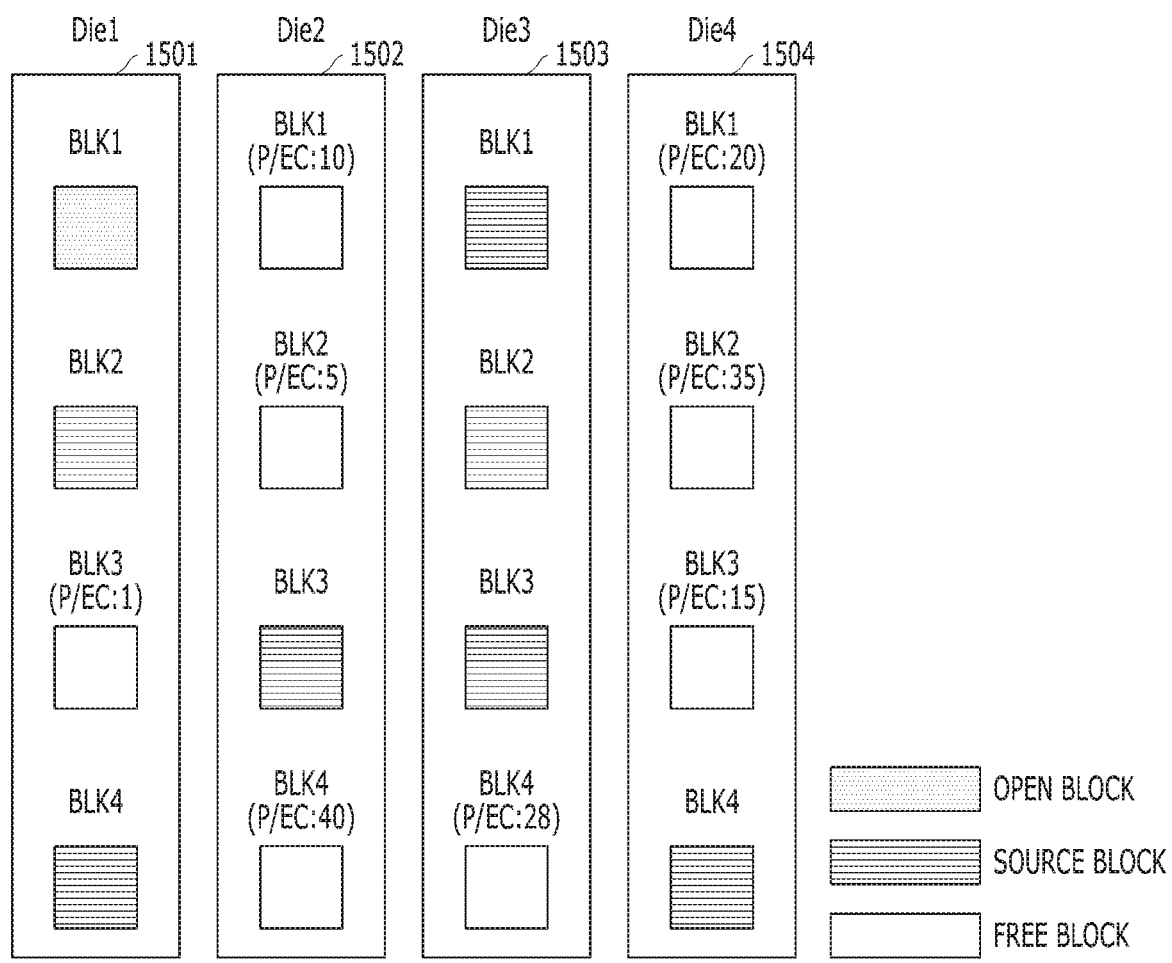

The memory device 150 may include a plurality of dies. For example, the plurality of dies may include a first die Die1 1501, a second die Die2 1502, a third die Die3 1503 and a fourth die Die4 1504. Each of the dies 1501 to 1504 may include a plurality of memory blocks. Referring to FIG. 5, the plurality of memory blocks may include a first memory block BLK1, a second memory block BLK2, a third memory block BLK3 and a fourth memory block BLK4. However, the present embodiment is not limited thereto. The plurality of memory blocks BLK1 to BLK4 may be classified into free blocks, open or active blocks and source blocks. The free blocks are blocks having no data stored therein. For example, the free blocks may include the third memory block BLK3 of the first die Die1 1501, the first memory block BLK1, the second memory block BLK2 and the fourth memory block BLK4 of the second die Die2 1502, the fourth memory block BLK4 of the third die Die3 1503, and the first memory block BLK1, the second memory block BLK2 and the third memory block BLK3 of the fourth die Die4 1504. The open blocks are blocks having data stored therein and also include remaining pages to which data can be programmed. For example, the open block may include the first memory block BLK1 of the first die Die1 1501. The source blocks are closed blocks having data stored therein and including no pages to which data can be programmed. That is, the source blocks have no empty pages to which data can be programmed. For example, the source blocks may include the second memory block BLK2 and the fourth memory block BLK4 of the first die Die1 1501, the third memory block BLK3 of the second die Die2 1502, the first memory block BLK1, the second memory block BLK2 and the third memory block BLK3 of the third die Die3 1503, and the fourth memory block BLK4 of the fourth die Die4 1504.

Referring back to FIG. 4, the controller 130 may include a memory 144 and a GC control component 196. The GC control component 196 may include a GC operation determiner 196A, a GC operator 196B and a GC destination block manager 196C. Referring to FIGS. 4 to 6, an operation of the GC control component 196 will be described.

The memory 144 may include a garbage collection (GC) buffer 144A and a destination block candidate list 144B. The GC buffer 144A may be used to temporarily store valid data of a victim block, which are to be transferred to a destination block, when a GC operation is performed. The destination block candidate list 144B is a list for storing destination block candidates to which the valid data of the victim block can be transferred. That is, the destination block candidates may be selected among free blocks through a GC destination block manager 196C which will be described below, based on program/erase (P/E) cycle counts (P/EC). The destination block candidates stored in the destination block candidate list 144B may be sorted in ascending order of the P/E cycle counts or given priorities. That is, the destination block candidates may be sorted and stored in ascending order from the free block having the lowest P/E cycle count, or sorted and stored according to the given priories. The P/E cycle may be considered as one of the parameters which can describe the operation states of the respective blocks (for example, the lifetimes and the healthy states). The destination block candidates may be decided based on other parameters which can describe the operation states of the respective blocks within the memory device 150.

Referring to the destination block candidate list 144B illustrated in FIG. 6, a destination block candidate and P/E cycle count information may be stored for each index Index[i]. For example, a first destination block candidate indicating the second memory block BLK2 in the second die Die2 1502 (Die2_BLK2) and a P/E cycle count of '5' may be stored at the index Index[1]. Furthermore, a second destination block candidate indicating the first memory block BLK1 in the second die Die2 1502 (Die2_BLK1) and a P/E cycle count of '10' may be stored at the index Index[2]. Furthermore, a third destination block candidate indicating the third memory block BLK3 in the fourth die Die4 1504 (Die4_BLK3) and a P/E cycle count of '15' may be stored at the index Index[3]. Furthermore, a fourth destination block candidate indicating the first memory block BLK1 in the fourth die Die4 1504 (Die4_BLK1) and a P/E cycle count of '20' may be stored at the index Index[4]. In the present embodiment, four destination block candidates are stored in the destination block candidate list. However, the present embodiment is not limited thereto. The method for selecting a destination block candidate will be described in detail based on the configuration of the GC destination block manager 196C which will be described below.

The GC operation determiner 196A may determine whether to perform a GC operation based on a free block count (FBC) in each predetermined period. That is, the GC operation determiner 196A may check whether the FBC is less than a first threshold value TH1, in order to determine whether to perform a GC operation. The first threshold value TH1 may indicate the minimum FBC for determining a point of time that the controller 130 needs to secure one or more free blocks. The first threshold value TH1 may be a predetermined value, and the minimum FBC may be varied according to an operation condition of the memory system. When the FBC is less than the first threshold value TH1 (FBC<TH1), it may indicate that an event for performing a GC operation occurred, and thus the GC operation determiner 196A may enter a GC operation mode. When the FBC is greater than or equal to the first threshold value TH1 (FBC>=TH1), a GC operation may not be performed, and the GC operation determiner 196A may determine whether to perform a GC operation based on the FBC in each predetermined period. When such a GC event occurred, a GC operation may be performed through the GC operator 196B.

The GC operator 196B may select one or more victim blocks among a plurality of source blocks in the plurality of dies. That is, the GC operator 196B may select, as a victim block for a GC operation, a source block in which the number of valid pages is less than or equal to a second threshold value TH2, among the plurality of source blocks. The GC operator 196B may temporarily store valid data of the selected victim block in the GC buffer 144A in the memory 144.

Then, the GC operator 196B may select a destination block from the destination block candidate list 144B, in order to move valid data of the victim block. At this time, the GC operator 196B may select the number of required destination blocks according to the number of the valid data. Here, the case in which the number of required destination blocks is 1 will be taken as an example for description. The GC operator 196B may sequentially check whether a destination block candidate is included in the same die as a die including an open block, from the index Index[i] of the destination block candidate list 144B. When the check result indicates that the destination block candidate is not included in the same die as the die including the open block, the GC operator 196B may select the corresponding destination block candidate as the destination block. For example, when the open block is included in the first die Die1 1501, the GC operator 196B may check whether the first destination block candidate stored at the index Index[1] of the destination block candidate list 144B is included in the first die Die1 1501 including the open block. Since the check result indicates that the first destination block candidate is the second memory block BLK2 in the second die Die2 1502, the first destination block candidate can be selected as the destination block because the first destination block candidate is not a memory block in the same die as the die including the open block. Then, the information of the selected destination block candidate may be deleted from the destination block candidate list 144B.

On the other hand, when the destination block candidate is included in the same die as the die including the open block, the GC operator 196B may increase the index Index[i] one by one, in order to check whether destination block candidates are included in the same die as the die including the open block. As such, for a range of indexes from the index Index[1] to the index Index[i_max] of the destination block candidate list 144B, the GC operator 196B may check whether the destination block candidates are included in the same die as the die including the open block. Here, i_max represents the maximum number of destination block candidates which can be stored in the destination block candidate list 144B. When the check result indicates that the destination block candidates from the index Index[1] to the index Index[i_max] are included in the same die as the die including the open block, the GC operator 196B may select destination block candidates from a die different from the die including the open block, through the GC destination block manager 196C. Then, the GC operator 196B may select, as the destination block, the destination block candidate having the lowest P/E cycle among the selected destination block candidates.

The GC operator 196B may check whether the destination block candidates are present in the destination block candidate list 144B, before selecting the destination block from the destination block candidate list 144B to store valid data of the victim block. When no destination block candidates are present in the destination block candidate list 144B, the GC operator 196B may select one or more destination block candidates through the GC destination block manager 196C, and store the selected destination block candidates in the destination block candidate list 144B.

The GC operator 196B may copy and store the valid data temporarily stored in the GC buffer 144A into the selected destination block. For example, the GC operator 196B may copy and store the valid data into the selected destination block, i.e. the second memory block BLK2 as a free block in the second die Die2 1502. Then, the GC operator 196B may erase all pages included in the victim block, and then set the victim block to a free block.

The GC destination block manager 196C may select destination block candidates from dies which are not related to the open block, among the plurality of dies. Further, the GC destination block manager 196C may store the selected destination block candidates in the destination block candidate list 144B in the memory 144. Here, there may be various methods for selecting destination block candidates, depending on a designer's selection. In the embodiment, two methods will be exemplified.

The first method will be described as follows. The GC destination block manager 196C may check whether one or more free blocks are present in the other dies except an $n^{th}$ die including an open block. When the check result indicates that one or more free blocks are not present in the other dies, the GC destination block manager 196C may select, as a destination block candidate, a memory block whose P/E cycle count is less than or equal to a third threshold value TH3, among memory blocks included as free blocks in the $n^{th}$ die. Further, the GC destination block manager 196C may store the destination block candidate in the destination block candidate list 144B. For example, when a memory block is a free block whose P/E count is less than or equal to the third threshold value TH3 of 20, is selected from the first die Die1 1501 including the open block, the third memory block BLK3 may become a destination block candidate because the P/E cycle count of the third memory block BLK3 is 1. The reason to select, as a destination block candidate, a memory block whose P/E cycle count is less than or equal to the predetermined threshold value is that the erase speed for memory cells included in a memory block is relatively high at the initial stage, but may be decrease as the P/E cycle count of the memory block increases. That is because, when the program speed and erase speed for memory cells in the memory block are high, changes in threshold voltages of the memory cells are increased as the P/E cycle count of the memory block increases, and thus the memory cells deteriorate at higher speed.

On the other hand, when one or more free blocks are present in the other dies, the GC destination block manager 196C may select, as a destination block candidate, a free block whose P/E cycle count is less than or equal to a fourth threshold value TH4, and store the destination block candidate in the destination block candidate list. For example, FIG. 5 shows that the die including the open block among the plurality of dies is the first die Die1 1501. The GC destination block manager 196C may check whether free blocks are present in the second to fourth dies Die2 to Die4 except the first die Die1 1501. The check result shows that the first memory block BLK1, the second memory block BLK2 and the fourth memory block BLK4 of the second die Die2 1502, the fourth memory block BLK4 of the third die Die3 1503, and the first memory block BLK1, the second memory block BLK2 and the third memory block BLK3 of the fourth die Die4 1504 are free blocks. The GC destination block manager 196C may select, as destination block candidates, memory blocks whose P/E cycle counts are less than or equal to the fourth threshold value TH4, among the plurality of memory blocks included as free blocks in the second to fourth dies Die2 to Die4. For example, the P/E cycle counts of the first memory block BLK1, the second memory block BLK2 and the fourth memory block BLK4, which are included in the second die Die2 1502, are 10, 5 and 40, respectively. Furthermore, the P/E cycle count of the fourth memory block BLK4 in the third die Die3 1503 is 28, and the P/E cycle counts of the first memory block BLK1, the second memory block BLK2 and the third memory block BLK3, which are included in the fourth die Die4 1504, are 20, 35 and 15, respectively. When the fourth threshold value TH4 is less than or equal to '20', the GC destination block manager 196C may select, as destination block candidates, memory blocks whose P/E cycle counts are less than or equal to '20', among the plurality of memory blocks. Further, the GC destination block manager 196C may store the destination block candidates in the destination block candidate list 144B in ascending order from the memory block having the lowest P/E cycle count. As illustrated in FIG. 6, the second memory block BLK2 of the second die Die2 1502, the first memory block BLK1 of the second die Die2 1502, the third memory block BLK3 of the fourth die Die4 1504 and the first memory block BLK1 of the fourth die Die4 1504 may be sequentially stored as the selected destination block candidates in the destination block candidate list 144B.

According to the second method, the GC destination block manager 196C may check the memory block having the lowest P/E cycle count from the $n^{th}$ die including the open block. For convenience, the memory block will be referred to as a first candidate free block (CFB) CFB_1. Then, the GC destination block manager 196C may check the memory block having the lowest P/E cycle count from the other dies except the $n^{th}$ die. For convenience, the memory block will be referred to as a second CFB CFB_2.

Then, the GC destination block manager 196C may check whether the P/E cycle count of the first CFB CFB_1 is less than the P/E cycle count of the second CFB CFB_2. When the check result indicates that the P/E cycle count of the first CFB CFB_1 is not less than the P/E cycle count of the second CFB CFB_2 (No), the GC destination block manager 196C may select a destination block candidate among the free blocks in the other dies. That is, the GC destination block manager 196C may select, as the destination block candidate, a free block whose P/E cycle count is less than or equal to a sixth threshold value TH6, among the free blocks included in the other dies, and store the destination block candidate in the destination block candidate list 144B.

On the other hand, when the check result indicates that the P/E cycle count of the first CFB CFB_1 is less than the P/E cycle count of the second CFB CFB_2 (Yes), the GC destination block manager 196C may check whether a difference between the P/E cycle count of the first CFB CFB_1 and the P/E cycle count of the second CFB CFB_2 is less than a fifth threshold value TH5. The reason to compare the difference between the P/E cycle count of the first CFB CFB_1 and the P/E cycle count of the second CFB CFB_2 with the fifth threshold value TH5 is that, when the first CFB CFB_1 in the $n^{th}$ die has a much smaller P/E cycle count than the second CFB CFB_2 in the other dies, the first CFB CFB_1 deteriorates at lower speed than the free blocks in the other dies. That is, as the P/E cycle count is increased, a change in threshold voltage of a memory cell may be increased to accelerate the deterioration in the memory cell.

When the check result indicates that the difference between the P/E cycle count of the first CFB CFB_1 and the P/E cycle count of the second CFB CFB_2 is less than the fifth threshold value TH5 (Yes), the GC destination block manager 196C may select, as a destination block candidate, a free block whose P/E cycle count is less than or equal to the sixth threshold value TH6, among the free blocks in the other dies, and store the destination block candidate in the destination block candidate list 1443.

On the other hand, when the check result indicates that the difference between the P/E cycle count of the first CFB CFB_1 and the P/E cycle count of the second CFB CFB_2 is greater than or equal to the fifth threshold value TH5 (No), the GC destination block manager 196C may select, as a destination block candidate, a memory block whose P/E cycle count is less than or equal to a seventh threshold value TH7, among the free blocks in all the dies, and store the destination block candidate in the destination block candidate list 144B.

Figure 7:
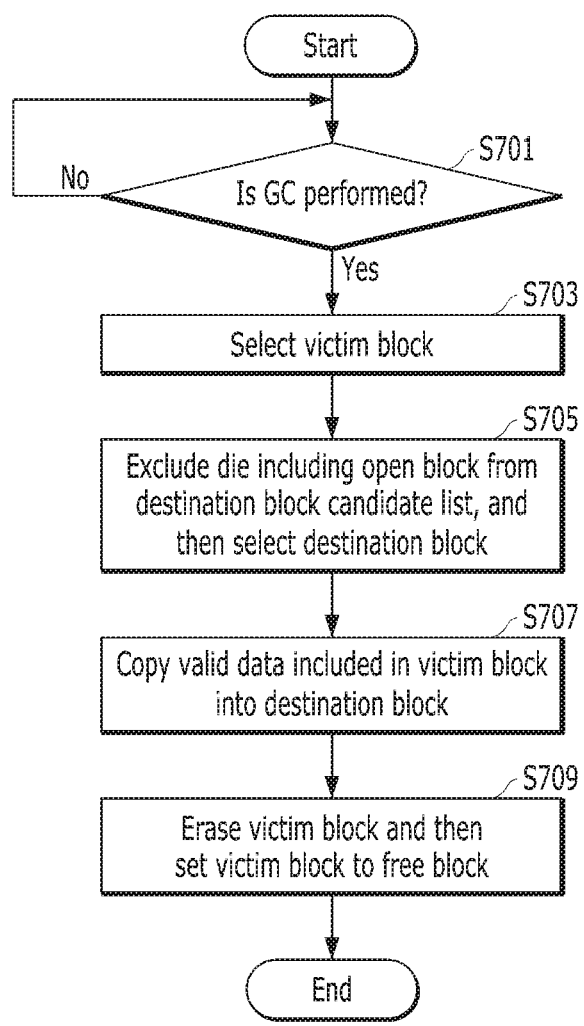
FIG. 7 is a flowchart illustrating an operating method of a memory system in accordance with an embodiment of the present invention.
Figure 8:
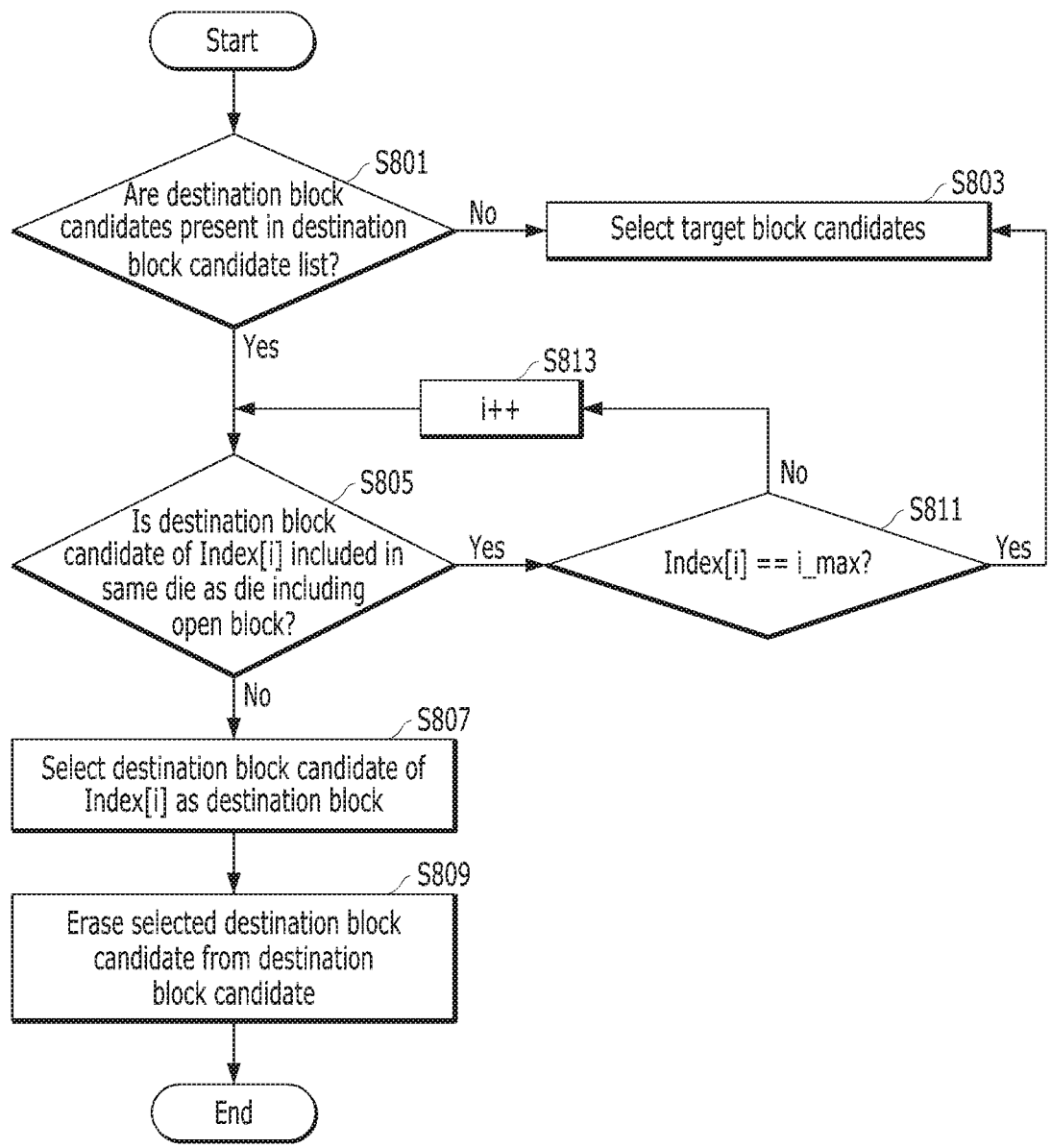
FIG. 8 is a flowchart illustrating step S705 of FIG. 7 in detail.
Figure 9:
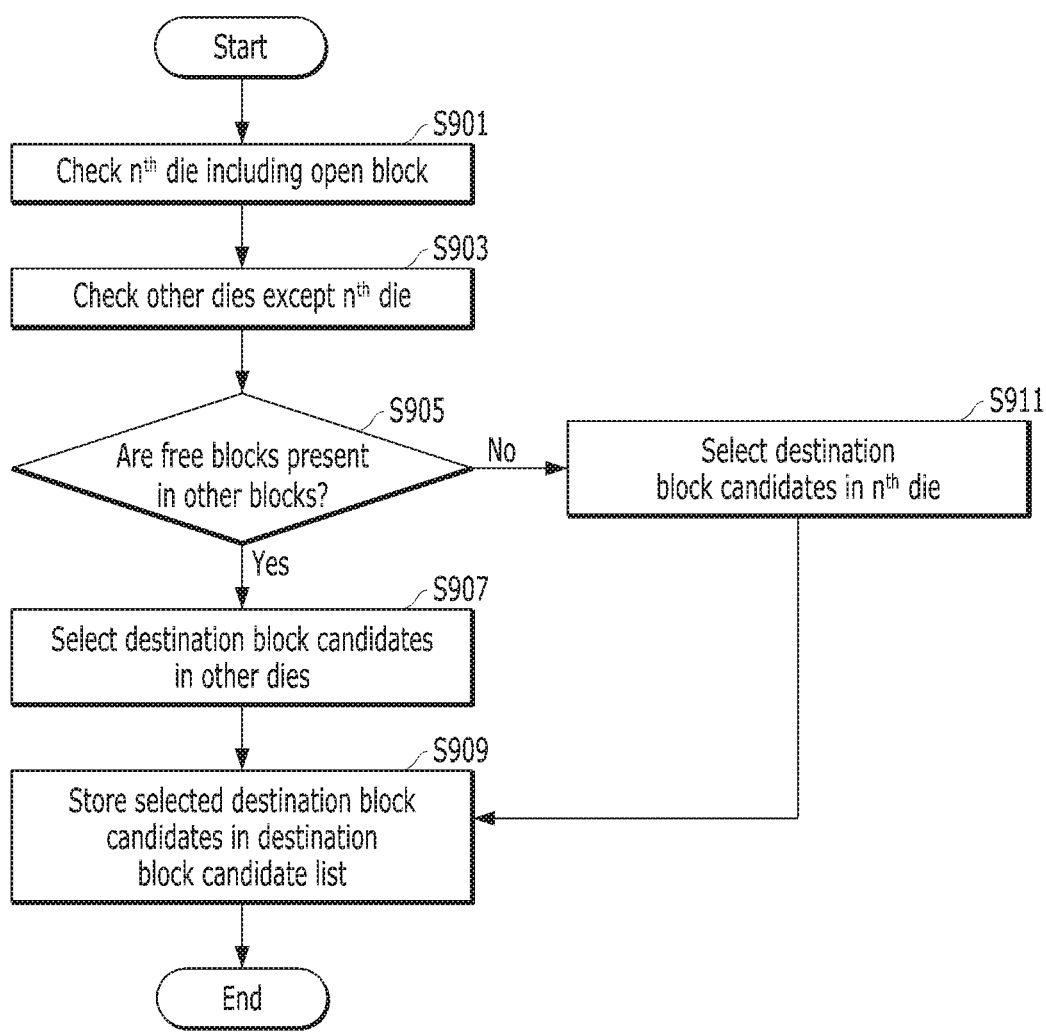
FIGS. 9 and 10 are flowcharts illustrating a method for selecting a destination block candidate in accordance with an embodiment in detail.
Figure 10:
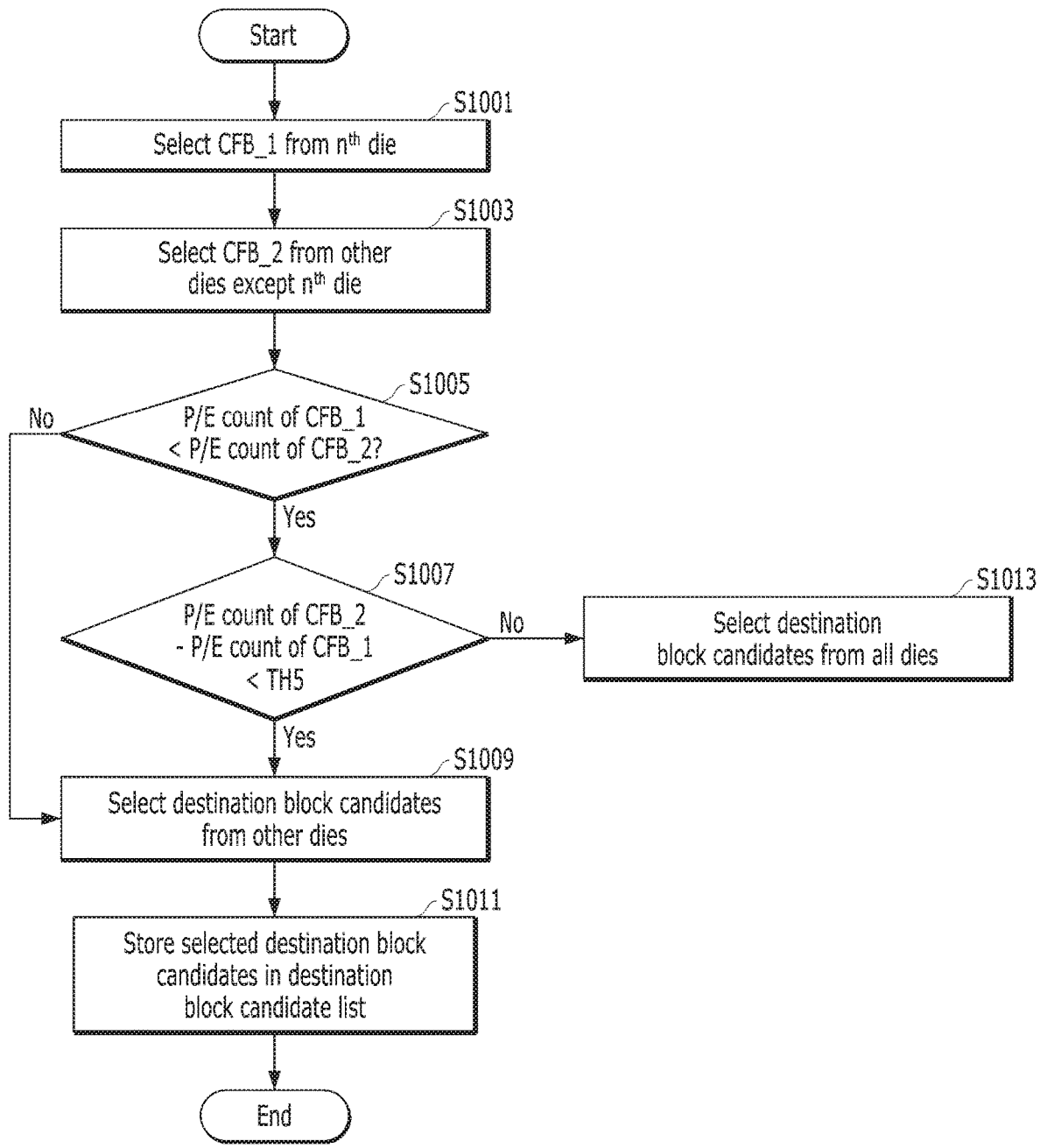

FIG. 7 is a flowchart illustrating an operating method of a memory system in accordance with an embodiment of the present invention. FIG. 8 is a flowchart illustrating step S705 of FIG. 7 in detail. FIGS. 9 and 10 are flowcharts illustrating a method for selecting a destination block candidate in accordance with an embodiment in detail.

Referring to FIG. 7, the controller 130 may determine whether to perform a GC operation based on the free block count (FBC), in each predetermined period, in step S701. That is, the controller 130 may check whether the FBC is less than the first threshold value TH1, in order to determine whether to perform a GC operation. The first threshold value TH1 may indicate the minimum FBC for determining a point of time that the controller 130 needs to secure one or more free blocks. The first threshold value TH1 may be a predetermined value, and the minimum FBC may be varied according to an operation condition of the memory system. When the FBC is less than the first threshold value TH1 (i.e., FBC<TH1), it may indicate that an event for performing a GC operation occurred, and thus the controller 130 may enter the GC operation mode. On the other hand, when the FBC is greater than or equal to the first threshold value TH1 (i.e., FBC>=TH1), the controller 130 may not perform a GC operation, and determine whether to perform a GC operation based on the FBC in each predetermined period.

In step S703, the controller 130 may select one or more victim blocks among a plurality of source blocks in the plurality of dies. That is, the controller 130 may select, as a victim block for the GC operation, a source block in which the number of valid pages is less than or equal to the second threshold value TH2, among the plurality of source blocks. The controller 130 may temporarily store valid data of the selected victim block in the GC buffer 144A.

In step S705, the controller 130 may select a destination block by referring to the destination block candidate list 144B, in order to move the valid data of the victim block. At this time, the controller 130 may select a required number of destination blocks from the destination block candidate list 144B according to a valid data count (VPC).

In step S707, the controller 130 may copy and store the valid data temporarily stored in the GC buffer 144A into the destination block.

In step S709, the controller 130 may erase all pages in the victim block, and then set the victim block to a free block.

FIG. 8 is a flowchart illustrating step S705 of FIG. 7 in detail. That is, FIG. 8 is a flowchart illustrating a method in which the controller 130 selects a destination block for storing the valid data of the victim block.

Referring to FIG. 8, in step S801, the controller 130 may check whether destination block candidates are present in the destination block candidate list 144B, in order to select a destination block from the destination block candidate list 144B.

When the check result indicates that no destination block candidates are present in the destination block candidate list 144B (No of S801), the controller 130 may select destination block candidates from dies different from a die including an open block, and then store the destination block candidates in the destination block candidate list 144B. Then, the controller 130 may select, as the destination block, a destination block candidate which is not included in the same die as the die including the open block, among the destination block candidates, in step S803.

On the other hand, when the destination block candidates are present in the destination block candidate list 144B (Yes of S801), the controller 130 may sequentially check whether the destination block candidates are included in the same die as the die including the open block, from the index Index[i] (i=1) of the destination block candidate list 1443, in step S805.

When the check result of step S805 indicates that the destination block candidate of the index Index[i] is not included in the same die as the die including the open block (No of S805), the controller 130 may select the destination block candidate of the index Index[i] as the destination block in step S807.

In step S809, the controller 130 may erase (or delete) the selected destination block candidate from the destination block candidate list 144B.

When the check result of step S805 indicates that the destination block candidate of the index Index[i] is included in the same die as the die including the open block (Yes of S805), the controller 130 may check whether the index Index[i] is the last index[i_max] of the destination block candidate list, in step S811.

When the check result indicates that the index Index[i] is the last index[i_max] of the destination block candidate list 144B, the controller 130 may select destination block candidates from the dies different from the die including the open block, and then store the selected destination block candidates in the destination block candidate list 144B. Then, the controller 130 may select, as the destination block, a destination block candidate which is not included in the same die as the die including the open block, among the destination block candidates, in step S803.

On the other hand, when the check result indicates that the index Index[i] is not the last index[i_max] of the destination block candidate list 144B, the controller 130 may increment the index Index[i], i.e., add 1 to the index Index[i] in step S813. Further, the controller 130 may return to step S805 to check whether the destination block candidate of the index Index[i] is included in the same die as the die including the open block.

FIGS. 9 and 10 are flowcharts illustrating step S803 of FIG. 8 in detail. That is, FIGS. 9 and 10 are flowcharts illustrating a method in which the controller 130 selects destination block candidates among free blocks in the memory device 150. The controller 130 may select destination block candidates from dies which are not related to the open block, among the plurality of dies. Further, the controller 130 may store the selected destination block candidates in the destination block candidate list 144B in the memory 144. There may be various methods for selecting destination block candidates depending on the configuration and design of the memory system. In the embodiment, two methods will be exemplified and described with reference to FIGS. 9 and 10.

In FIG. 9, the controller 130 may use a free block positioned in a die different from the die where the open block on which a program operation is performed is positioned, in order to perform a GC operation in parallel while performing the program operation corresponding to a program command received from outside.

Referring to FIG. 9, the controller 130 may check an $n^{th}$ die including the open block in step S901.

In step S903, the controller 130 may check whether free blocks are present in the other dies except the $n^{th}$ die.

When the check result indicates that one or more free blocks are not present in the other dies (No of S905), the controller 130 may select, as a destination block candidate, a memory block whose P/E cycle count is less than or equal to the third threshold value TH3 among memory blocks as free blocks in the $n^{th}$ die, in step S911. In step S909, the controller 130 may store the selected one or more destination block candidates in the destination block candidate list 144B.

On the other hand, when the check result indicates that one or more free blocks are present in the other dies (Yes of S905), the controller 130 may select, as one or more destination block candidates, one or more memory blocks whose P/E cycle counts are less than or equal to the fourth threshold value TH4, among the memory blocks as free blocks in the other dies, in step S907. In step S909, the controller 130 may store the selected one or more destination block candidates in the destination block candidate list 144B.

The reason to select, as a destination block candidate, a memory block whose P/E cycle count is less than or equal to the predetermined threshold value is that the erase speed for memory cells in a memory block is relatively high at the initial stage, but may be relatively decreased as the P/E cycle count of the memory block increases. That is because, when the program speed and erase speed for memory cells in the memory block are high, changes in threshold voltages of the memory cells are increased as the P/E cycle count of the memory block increases, and thus the memory cells deteriorate at higher speed.

FIG. 10 illustrates a method for selecting a destination block for a GC operation by reflecting the operation states (e.g. the lifetimes and healthy states) of the blocks in each of the dies while a program operation and a GC operation are performed in parallel.

Referring to FIG. 10, the controller 130 may check the memory block having the lowest P/E cycle count from the $n^{th}$ die including the open block, in step S1001. For convenience, the memory block having the lowest P/E cycle count will be referred to as a first candidate free block (CFB) CFB_1.

In step S1003, the controller 130 may check the memory block having the lowest P/E cycle count from the other dies except the $n^{th}$ die. For convenience, the memory block having the lowest P/E cycle count will be referred to as a second CFB CFB_2.

In step S1005, the controller 130 may check whether the P/E cycle count of the first CFB CFB_1 is less than the P/E cycle count of the second CFB CFB_2.

When the check result of step S1005 indicates that the P/E cycle count of the first CFB CFB_1 is less than the P/E cycle count of the second CFB CFB_2 (Yes of S1005), the controller 130 may check whether a difference between the P/E cycle count of the first CFB CFB_1 and the P/E cycle count of the second CFB CFB_2 is less than the fifth threshold value TH5, in step S1007. The reason to compare the difference between the P/E cycle count of the first CFB CFB_1 and the P/E cycle count of the second CFB CFB_2 to the fifth threshold value TH5 is that, when the first CFB CFB_1 in the $n^{th}$ die has a much smaller P/E cycle count than the second CFB CFB_2 in the other dies, the first CFB CFB_1 deteriorates at lower speed than the free blocks in the other dies. Therefore, the controller 130 may select the destination block candidate even among the free blocks in the $n^{th}$ die.

When the check result of step S1007 indicates that the difference between the P/E cycle count of the first CFB CFB_1 and the P/E cycle count of the second CFB CFB_2 is less than the fifth threshold value TH5 (Yes of S1007), the controller 130 may select one or more destination block candidates among the free blocks in the other dies in step S1009. That is, the controller 130 may select, as the one or more destination block candidates, one or more free blocks whose P/E cycle counts are less than or equal to the sixth threshold value TH6, among the free blocks in the other dies. In step S1011, the controller 130 may store the selected one or more destination block candidates in the destination block candidate list 144B.

On the other hand, when the check result of step S1007 indicates that the difference between the P/E cycle count of the first CFB CFB_1 and the P/E cycle count of the second CFB CFB_2 is greater than or equal to the fifth threshold value TH5 (No of S1007), the controller 130 may select one or more destination block candidates among the free blocks in all the dies in step S1013. That is, the controller 130 may select, as the one or more destination block candidates, one or more memory blocks whose P/E cycle counts are less than or equal to the seventh threshold value TH7, among the memory blocks as free blocks in all the dies. In step S1011, the controller 130 may store the selected one or more destination block candidates in the destination block candidate list 144B.

When the check result of step S1005 indicates that the P/E cycle count of the first CFB CFB_1 is not less than the P/E cycle count of the second CFB CFB_2 (No of S1005), the controller 130 may select destination block candidates among the free blocks in the other dies in step S1009. That is, the controller 130 may select, as the destination block candidates, free blocks whose P/E cycle counts are less than or equal to or less than the sixth threshold value TH6, among the free blocks in the other dies, and store the selected destination block candidates in the destination block candidate list 144B, in step S1011.

In accordance with the above-described embodiments, the controller may control one or more open blocks in order to store a program command and data in the memory device. The controller may sequentially program data in the open blocks. Thus, the program operation may be delayed when data sorted through a GC operation are programmed to the same open block. Furthermore, when the program operation is preferentially performed, the operation of programming the data sorted through the GC operation to the memory device may be delayed, or the GC operation may be stopped. The controller may select, as a destination block for the GC operation, a different position from the position of the block where the program operation is performed, such that different data (for example, program data and valid data sorted through the GC operation) may be transferred through different data paths (for example, channels or ways).

In an embodiment, the controller may reflect the operation states of the respective blocks to select a block to which different data are programmed. For example, in order to perform a program operation and a GC operation in parallel, the controller may select a die for the GC operation, and select a free block within the selected die according to the operation state of the block.

In an embodiment, the controller may preferentially consider the operation state of the destination block rather than the position of the destination block, while programming different data to the memory device.

In accordance with the present embodiments, the memory system may select a destination block for a GC operation in a die which does not include an open block for a program operation, and thus perform a GC operation and a program operation in parallel. Therefore, the memory system may shorten the GC operation time.

Furthermore, the memory system which performs a GC operation may select a healthier block to program data, thereby stably performing the GC operation.

Although various embodiments have been described for illustrative purposes, it will be apparent to those skilled in the art that various changes and modifications may be made without departing from the spirit and scope of the invention as defined in the following claims.

What is claimed is:
1. A memory system comprising:
a plurality of dies; and
a controller coupled to the plurality of dies through a plurality of data paths, the controller being suitable for transmitting first data received from a host and second data obtained through an internal operation in parallel through the plurality of data paths, wherein the controller selects a first candidate free block (CFB) from an $n^{th}$ die including an open block among the plurality of dies, selects a second CFB from the other dies except the $n^{th}$ die, and checks whether a difference in program/erase (P/E) cycle count between the first CFB and the second CFB is less than a predetermined threshold value, and wherein the controller selects destination block candidates among free blocks in the other dies and stores the selected destination block candidates in the destination block candidate list, when the difference in P/E cycle count between the first CFB and the second CFB is less than the predetermined threshold value.

2. The memory system of claim 1, wherein the controller alternately transfers the first data and the second data through any one data path of the plurality of data paths.

3. The memory system of claim 1, wherein the controller selects a victim block having a small number of valid data among a plurality of memory blocks in the plurality of dies, sorts the valid data of the victim block as the second data, selects a destination block in a die different from a die including an open block in which the first data are to be stored, and programs the second data to the selected destination block.

4. The memory system of claim 1, wherein the controller comprises a memory having a garbage collection (GC) buffer suitable for temporarily storing the second data and a destination block candidate list including destination block candidates for programming the second data.

5. The memory system of claim 4, wherein the controller determines the number of required destination blocks based on the number of the second data, selects the destination block from the destination block candidate list, and copies the second data temporarily stored in the GC buffer into the selected destination block.

6. The memory system of claim 3, wherein the controller checks an $n^{th}$ die including an open block among the plurality of dies, and checks whether free blocks are present in the other dies except the $n^{th}$ die, wherein the controller selects destination block candidates from free blocks in the other dies, and stores the selected destination block candidates in the destination block candidate list, when the free blocks are present in the other dies, and wherein the controller selects destination block candidates from the $n^{th}$ die and stores the selected destination block candidates in the destination block candidate list, when no free blocks are present in the other dies.

7. The memory system of claim 1, wherein the controller selects destination block candidates from the plurality of dies and stores the selected destination block candidates in the destination block candidate list, when the difference in P/E cycle count between the first CFB and the second CFB is greater than or equal to the predetermined threshold value.

8. The memory system of claim 7, wherein after selecting the first CFB and the second CFB, the controller checks whether the P/E cycle count of the first CFB is less than the P/E cycle count of the second CFB, wherein the controller checks whether the difference in P/E cycle count between the first CFB and the second CFB is less than the predetermined threshold value, when the P/E cycle count of the first CFB is less than the P/E cycle count of the second CFB, and wherein the controller selects destination block candidates among the free blocks in the other dies and stores the selected destination block candidates in the destination block candidate list when the P/E cycle count of the first CFB is greater than the P/E cycle count of the second CFB.

9. The memory system of claim 4, wherein the destination block candidates in the destination block candidate list are sorted in ascending order from the free block having the lowest P/E cycle count, based on the P/E cycle counts of the selected free blocks.

10. The memory system of claim 3, wherein the controller stores the valid data of the victim block in the selected destination block, and sets the victim block to a free block by erasing all pages of the victim block.

11. An operating method of a memory system which includes a plurality of dies and a controller coupled to the plurality of dies through a plurality of data paths, the operating method comprising:

transmitting first data and second data in parallel through the plurality of data paths, wherein the first data corresponds to a command operation according to a command received from a host, and the second data are obtained through an internal operation, wherein the internal operation comprises:

selecting a victim block among a plurality of memory blocks in the plurality of dies;

sorting valid data of the victim block as the second data;

selecting a destination block which is not included in a die of an open block, from a destination block candidate list, wherein the destination block candidate list is a list for storing destination block candidates which are selected among the plurality of free blocks based on program/erase (P/E) cycle counts of the plurality of free blocks, wherein the destination block candidates are sorted in ascending order from the free block having the lowest P/E cycle count or given priorities, and wherein the selecting the destination block candidates among the plurality of free blocks based on the P/E cycle counts of the plurality of free blocks comprises:

checking an $n^{th}$ die including an open block in which the first data are to be stored, among the plurality of dies;

checking whether free blocks are present in the other dies except the $n^{th}$ die; and selecting, as destination block candidates, free blocks whose P/E cycle counts are less than or equal to a predetermined threshold value, among the free blocks in the other dies, and storing the selected destination block candidates in the destination block candidate list, when the free blocks are present in the other dies.

12. The operating method of claim 11, wherein the internal operation further comprises:

programming the second data to the selected destination block; and setting the victim block to a free block by erasing all pages of the victim block, after programming the second data.

13. The operating method of claim 12, further comprising deciding the number of required destination blocks based on the number of valid data of the selected victim block, before the selecting the destination block which is not included in the die of the open block from the destination block candidate list.

14. The operating method of claim 12, wherein the selecting the destination block which is not included in the die of the open block from the destination block candidate list comprises:
  checking whether destination block candidates are present in the destination block candidate list;
  checking whether the destination block candidates are included in the same die as the die of the open block, from a first destination block candidate having the lowest program/erase (P/E) cycle count, when the destination block candidates are present in the destination block candidate list;
  selecting the first destination block candidate as the destination block when the first destination block candidate is not included in the same die as the die of the open block;
  increasing an index by one to check whether a second destination block candidate is included in the same die as the open block, when the first destination block candidate is included in the same die as the die of the open block; and
  selecting destination block candidates from the plurality of free blocks and storing the selected destination block candidates in the destination block candidate list, when no destination block candidates up to the last destination block candidate of the destination block candidate list are selected as the destination block.

15. The operating method of claim 14, further comprising selecting destination block candidates which are not included in the die of the open block, from the plurality of free blocks, and storing the selected destination block candidates in the destination block candidate list, when no destination block candidates are present in the destination block candidate list.

16. The operating method of claim 12, wherein the selecting the destination block candidates among the plurality of free blocks based on the P/E cycle counts of the plurality of free blocks further comprises:
  selecting, as destination block candidates, free blocks whose P/E cycle counts are less than or equal to the predetermined threshold value, among free blocks in the $n^{th}$ die, and storing the selected destination block candidates in the destination block candidate list, when no free blocks are present in the other dies.

17. The operating method of claim 12, wherein the selecting the destination block candidates among the plurality of free blocks based on the P/E cycle counts of the plurality of free blocks comprises:
  selecting a first candidate free block (CFB) from an $n^{th}$ die including an open block among the plurality of dies;
  selecting a second CFB from the other dies except the $n^{th}$ die;
  checking whether a difference in P/E cycle count between the first CFB and the second CFB is less than a predetermined threshold value;
  selecting destination block candidates among the free blocks in the other dies and storing the selected destination block candidates in the destination block candidate list, when the difference in P/E cycle count between the first CFB and the second CFB is less than the predetermined threshold value; and
  selecting destination block candidates from the plurality of dies and storing the selected destination block candidates in the destination block candidate list, when the difference in P/E cycle count between the first CFB and the second CFB is greater than or equal to the predetermined threshold value.

18. The operating method of claim 17, further comprising, before the checking of whether the difference in P/E cycle count between the first CFB and the second CFB is less than the predetermined threshold value:
  checking whether the P/E cycle count of the first CFB is less than the P/E cycle count of the second CFB;
  checking whether the difference in P/E cycle count between the first CFB and the second CFB is less than the predetermined threshold value, when the P/E cycle count of the first CFB is less than the P/E cycle count of the second CFB; and
  selecting destination block candidates among the free blocks in the other dies and storing the selected destination block candidates in the destination block candidate list, when the P/E cycle count of the first CFB is greater than the P/E cycle count of the second CFB.

19. The operating method of claim 11, further comprising alternately transferring the first data and the second data through any one data path of the plurality of data paths.

* * * * *